Y. MIYASAKI.
CAST TRUCK BOLSTER.
APPLICATION FILED JAN. 19, 1917.
Reissued May 29, 1917. 14,307.
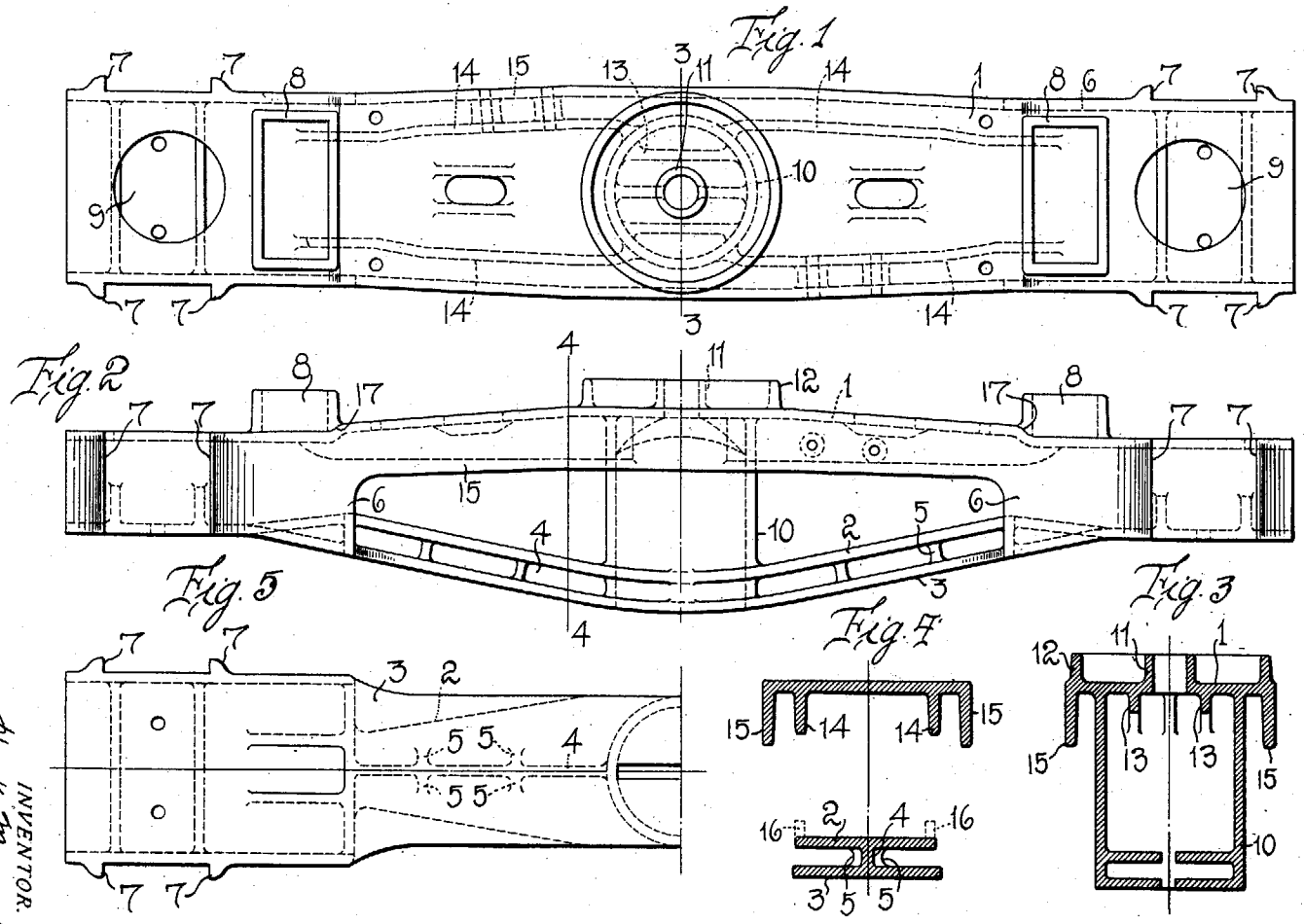
INVENTOR.
Yuske Miyasaki.
By Watson E. Coleman
Attorney
THE NORRIS PETERS CO., PHOTO-LITHO., WASHINGTON, D. C.

UNITED STATES PATENT OFFICE.

YUSKE MIYASAKI, OF McKEES ROCKS, PENNSYLVANIA.

CAST TRUCK-BOLSTER.

14,307. Specification of Reissued Letters Patent. Reissued May 29, 1917.

Original No. 1,189,608, dated July 4, 1916, Serial No. 60,929, filed November 11, 1915. Application for reissue filed January 19, 1917. Serial No. 143,318.

*To all whom it may concern:*

Be it known that I, YUSKE MIYASAKI, a subject of the Emperor of Japan, residing at McKees Rocks, in the county of Allegheny and State of Pennsylvania, have invented certain new and useful Improvements in Cast Truck-Bolsters, of which the following is a specification, reference being had to the accompanying drawings.

This invention relates to certain improvements in cast truck bolsters and is an improvement on the bolster disclosed in my prior Patent, No. 1,156,305, dated October 12, 1915; and it is an object of the present invention to provide a bolster having novel and improved construction whereby a maximum vertical strength of the bolster will be obtained.

It is also an object of the invention to provide a novel and improved bolster wherein the top chord member is reinforced by spaced marginal flanges arranged in each marginal portion thereof whereby greater horizontal strength will be afforded by the top chord member.

The invention also has for a further object to provide a bolster of this general character wherein the upper and lower bottom chord members are employed and wherein the upper bottom chord member is provided with upwardly directed longitudinal flanges in order to impart additional strength to the bolster especially when employed in connection with large capacity cars.

The invention consists in the details of construction and in the combination and arrangement of the several parts of my improved truck bolster whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be better understood, I will now proceed to describe the same with reference to the accompanying drawings, wherein—

Figure 1 is a view in top plan of a bolster constructed in accordance with an embodiment of my present invention;

Fig. 2 is a side elevational view of the bolster as herein embodied;

Fig. 3 is a sectional view taken substantially on the line 3—3 of Fig. 1;

Fig. 4 is a sectional view taken substantially on the line 4—4 of Fig. 2; and

Fig. 5 is a view in bottom plan of one longitudinal half of the bolster as herein embodied.

As disclosed in the accompanying drawings, 1 denotes the top chord member, and 2 and 3 designate the upper and lower bottom chord members which are integrally connected to each other at intervals by a central longitudinally extending web 4 and the spaced ribs 5 which are integrally formed with the opposite faces of the web 4 and the opposed faces of the chord members 2 and 3.

At their opposite ends the top and bottom chord members 1 and 3 are integrally connected together by the vertical walls 6 and the outer faces of these vertical walls have the usual guide flanges 7 formed thereon and the extended ends of the upper chord member 1 are provided with the bearings 8 and spring seats 9. The top chord member 1 and the upper and lower bottom chord members are integrally connected and braced to resist vertical strains by a central tubular truss 10. The compression plate or top chord member 1 is centrally formed with an upwardly projecting tubular boss 11 to receive the center pin and a concentrically related upstanding flange is also formed upon said compression plate or top chord member 1 to receive a body center plate. The vertical cylindrical truss 10 is of less diameter than the flange to support the bearing portion of the top chord. The central portion of the compression plate or top chord member 1 is effectively reinforced by means of a plurality of longitudinally extending bracing webs 13 which integrally connect the bottom face of said compression plate or top chord member with the vertical wall of the vertical truss 10. The central tubular truss 10 is cast integrally at its ends with the top chord member or compression plate 1 and the lower bottom chord 3, while the chord member 2, at the center of the bolster, merges into and forms an integral part of the wall of said truss. By providing a central truss of the same diameter throughout its length, and without taper, the proper coring of the same is greatly expedited.

The bearing area of the vertical truss upon the bottom chord members is also increased.

It will be noted from the foregoing description that only a single chord member is comprised in the top. The metal which would be used in the provision of a lower top chord member is employed in the production of the inner vertical flanges 14 which impart greater horizontal strength to the top member or compression plate 1 on account of the metal being concentrated close to the outer flanges 15 and a portion of said metal is added to the bottom chord members whereby the center of gravity or the neutral axis of a vertical section will be lowered. This brings the distance from the neutral axis to the farthest fiber nearer to a half of the total depth of the vertical section and therefore the section modulus of the section will be increased and thus result in greater vertical strength of the bolster. The longitudinal edges of the compression plate or top chord member 1 have depending flanges 15 formed thereon, the ends of said flanges being integral with the vertical side walls 6 of the bolster. By provision of the inner vertical flanges 14 in combination with the outer flanges 15, the thickness of the top chord may be maintained more nearly equal to the thickness of other parts of the bolster construction, thereby reducing the liability of latent defects of the bolster to a minimum. It is also to be noted that the inner flanges 14 are integrally connected at one end with the vertical truss 10 and have their opposite ends terminating below the bearings 8. The web of the top chord member 1 has an offset 17 near the side bearing 8 whereby the vertical strength toward the end of the bolster will be increased on account of the depth of vertical section being increased toward the ends.

In order that the requisite strength in bolsters to be employed upon large capacity cars may be obtained, the upper bottom chord member 2 has formed on the longitudinal edges thereof the upwardly extending flanges 16 shown in dotted lines in Fig. 4, said flanges being provided upon the upper bottom chord member 2 in order to facilitate coring at this point. It will also be perceived that by the use of the inner vertical flanges 14 in place of a horizontal flange as disclosed in the previous patent hereinbefore referred to, the coring under the top chord member or compression plate 1 will also be greatly simplified.

From the foregoing description, it will be recognized that the metal in the bolster is so distributed that the difference of thickness of all parts of the bolster may be reduced to a minimum thereby increasing the efficiency of the bolster and also a most economical section may be obtained and one which will offer a maximum resistance with a minimum amount of metal to the vertical and horizontal stresses.

It is thought to be obvious that a truck bolster constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. A cast truck bolster including spaced parallel longitudinally extending bottom chord members, the upper of said members having flanges formed on its longitudinal edges and directed away from the bottom chord member.

2. A cast truck bolster including spaced longitudinally extending chord members in vertically spaced relation, the upper of the chord members having longitudinal depending flanges and spaced longitudinally disposed flanges at opposite sides thereof and having an offset in the web near the end of the bolster to increase vertical strength of the bolster.

3. A cast truck bolster consisting of upper and lower longitudinally extended chord members integrally connected at opposite ends, and a vertical truss integrally connecting the chord members at the center of the bolster, the upper chord member being provided with spaced longitudinally disposed flanges at opposite sides thereof, each of said flanges being integrally connected with the central truss, the outer flange of each set extending the entire length of the bolster and the outer ends of the inner flanges terminating in close proximity to the ends of the bolster.

4. A cast truck bolster including spaced longitudinally extending chord members in vertically spaced relation, the lower of the said chord members having upper and lower chord members which are integrally connected to each other by a central longitudinally extending web, the upper of the said members having flanges formed on its longitudinal edges and directed away from the bottom chord member.

5. A cast truck bolster including upper and lower longitudinally extending chord members integrally connected at opposite ends, and a vertical truss integrally connecting the chord members at the center of the bolster, the upper of the said chord members having longitudinal depending flanges and spaced longitudinally disposed flanges at opposite sides thereof, each of the inner flanges being integrally connected with the central truss and the other ends terminating in close proximity to the ends of the bolster, the outer flange of each set extending the entire length of the bolster.

6. A cast truck bolster including spaced longitudinally extending chord members in vertically spaced relation and having their end portions connected, a central truss connecting said chord members, the upper of said chord members having longitudinally depending flanges, and longitudinally spaced flanges at opposite sides thereof, said longitudinally disposed flanges extending in opposite directions from the central truss and terminating in close proximity to the connected end portions of the chord members to increase the vertical and horizontal strength of the bolster.

In testimony whereof I hereunto affix my signature in the presence of two witnesses.

YUSKE MIYASAKI.

Witnesses:
ROBERT LOWRY,
RALPH D. BARNEY.

Copies of this patent may be obtained for five cents each, by addressing the "Commissioner of Patents, Washington, D. C."